UNITED STATES PATENT OFFICE.

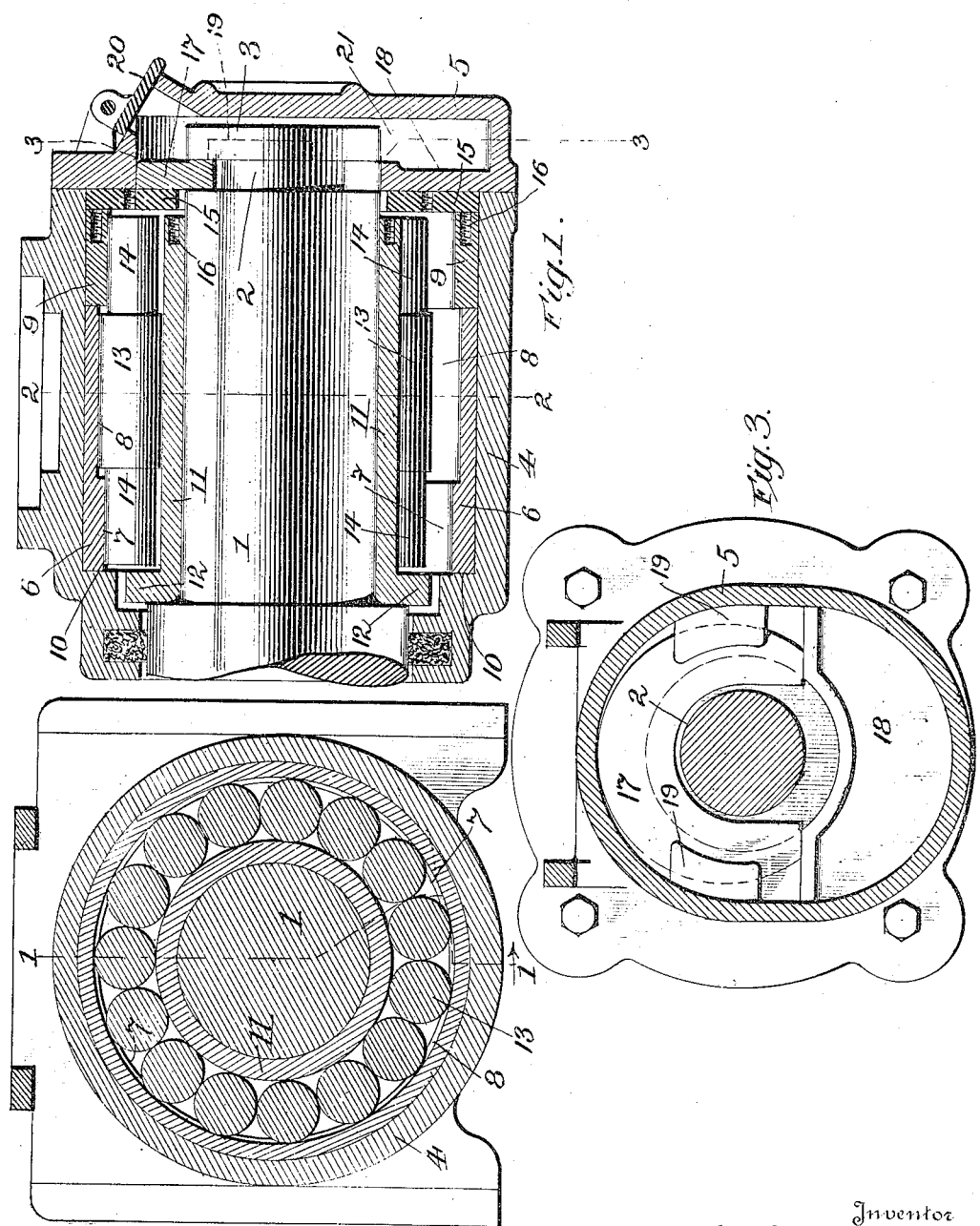

BENJAMIN S. LAWSON, OF BROOKLYN, NEW YORK, ASSIGNOR TO ASA L. MERRICK, OF SYRACUSE, NEW YORK.

ROLLER-BEARING.

1,159,964.  Specification of Letters Patent.  Patented Nov. 9, 1915.

Application filed July 25, 1914. Serial No. 853,117.

*To all whom it may concern:*

Be it known that I, BENJAMIN S. LAWSON, a citizen of the United States, residing at Brooklyn, in the county of Kings and State of New York, have invented certain new and useful Improvements in Roller-Bearings, of which the following is a specification.

My present invention pertains to an improved roller bearing, adapted more especially for employment upon railway cars, the same being especially applicable for use upon the large type of motor-propelled cars now in use in urban and suburban traffic.

The structure is illustrated in the annexed drawings, wherein:

Figure 1 is a longitudinal sectional view of the bearing, taken on the line 1—1 of Fig. 2; Fig. 2 a transverse sectional view on the line 2—2 of Fig. 1; and Fig. 3 a similar view on the line 3—3 of Fig. 1, illustrating more particularly the thrust yoke.

The present structure is, in a sense, an improvement upon the bearing set forth and claimed in Letters Patent No. 999,570, granted to me under date of August 1, 1911, and has for its main object the production of a bearing which, while maintaining all the advantages inherent in the patented structure, does away, to a great extent, with the end thrust present in the old structure. Under said old structure, when somewhat worn and by reason of the employment of rollers having tapering ends, there was a tendency for the box to slide longitudinally along the rollers and as a consequence much strain was placed upon the thrust bearing. Under the present arrangement this is eliminated to a considerable degree by the employment of rolls having a cylindrical central portion with like end portions of a smaller diameter.

A further object of the invention is to provide a structure in which the parts may be readily assembled and disassembled.

A still further object is to provide a removable bonnet, adapted when positioned to hold the thrust yoke in place, the bonnet also serving as a reservoir for lubricant.

Referring to the drawings, 1 denotes the axle formed with an annular circumferential groove 2, whereby a collar 3 is formed upon the outer end of the axle.

The main body of the box, denoted by 4, may be of any approved type, so long as its outer end is open, said end being normally closed by a bonnet 5, adapted to be bolted to the box. The interior of the box is preferably cylindrical, and fiting in the same is a bearing sleeve 6, having internal cylindrical radially-disposed bearing faces 7 and 8, the latter being formed upon a radius somewhat in excess of the other. A collar 9, the interior diameter of which is the same as that of the bearing face 7, is seated in the box and abuts at one side or edge against the adjacent edge of sleeve 6, the opposite edge of which sleeve contacts with a shoulder 10 formed upon the box. The inner face of said collar also forms a radially-disposed bearing surface, said surface and the surfaces 7 and 8 all facing in the same direction.

The axle, or more strictly speaking, the reduced end thereof, is preferably provided with a bearing sleeve 11, having an outwardly-extending flange 12 at the inner end thereof, said sleeve as well as sleeve 6 and collar 9 being preferably formed of steel suitably hardened. Interposed between the inner and outer bearing members thus formed is a series of rollers, each roller comprising a central cylindrical section 13 (of such diameter as to make a mechanical fit between bearing face 8 and sleeve 11), and end sections 14 of smaller diameter, adapted to bear, respectively, against the adjacent bearing face 7 and the inner face of collar 9. As will be seen upon reference to the upper portion of Fig. 1, the reduced or smaller ends, 14, of the rollers do not bear upon the inner bearing sleeve 11. The parts will be so proportioned that the rollers when assembled form a circular series, with the central sections 13 in contact with each other, as indicated in Fig. 2. A ring 15 is interposed between the outer edge of collar 9 and the inner wall of the bonnet 5 and serves to hold said collar 9 and sleeve 6 in proper position within the box body. Said ring, collar 9 and sleeve 11 will preferably be formed with threaded openings, as 16, into which a suitable tool or implement may be inserted when it is desired to withdraw said parts from the box.

As will be noted upon reference to Fig. 1, there is a slight clearance between the ends of the rollers and the adjacent parts, and likewise the central cylindrical sections 13 of the rollers are shorter than the length of the bearing face 8. This allows the rollers to act with perfect freedom and to maintain their true axial alinement with the axle, said rollers by reason of the different sized bearing faces, 13 and 14, being prevented from tilting or dragging out of position as they are carried around in the box by rotation of the axle and sleeve 11.

To prevent end thrust and consequent jamming of the parts, a yoke 17 extends into groove 2, the lower ends of the yoke resting on the upper edge of the wall 18 formed as a part of the bonnet at the lower portion thereof. Lugs 19, extending inwardly from the side walls of the bonnet, bear against said yoke, while the upper edge of the yoke underlies the upper wall of the bonnet when the bonnet is positioned and secured in place. It will thus be seen that the yoke cannot lift, nor can there be any sidewise movement thereof, as it is held firmly between lugs 19 and the adjacent ring 15. From this it will be seen that when the bonnet is secured in place it serves to lock all of the other parts in position.

A cover 20 will be provided for an opening formed in the bonnet through which lubricant may be introduced, the same passing down into a pocket or chamber 21 formed in the lower portion of the bonnet.

By making the rolls with the bearing faces 13 and 14 parallel with the axis of the axle, there is little or no tendency for the box to ride or slide endwise on the same, as is the case with rolls having tapered ends, when said tapered rolls become slightly worn.

The rollers may be made solid, or hollow as indicated in my previous Patent No. 999,570.

It will be noted that the rollers are independent of each other and that no cage or spacers are employed in conjunction therewith. The presence of such devices would prevent that freedom of movement above referred to, which enables the rollers, by reason of their construction, to maintain their true axial alinement.

Having thus described my invention, what I claim is:

1. In a journal-bearing, the combination of a box; an axle extending through the same; a plurality of disconnected and freely movable, independent rolls, each roll having a central cylindrical bearing surface and similar end portions smaller in diameter, said central portion alone transmitting the weight of the load to the axle; and a plurality of members mounted in the box and having radially-disposed bearing surfaces facing in the same direction and with which the various cylindrical surfaces of the rolls contact and find their bearings.

2. In a journal-bearing, the combination of a box; an axle extending into the same; a member mounted thereon having an outer cylindrical bearing surface; a plurality of rollers each having a central cylindrical bearing surface and similar end portions smaller in diameter, said central portions alone bearing on the aforesaid cylindrical bearing surface; a plurality of members mounted in the box and having radially-disposed bearing surfaces facing in the same direction and upon which the various cylindrical surfaces of the rollers find their bearings; and means located at the outer end of the box for securing said parts in place, whereby upon removal of said means, the parts, one or more, may be readily removed from the box without removing the axle from the box.

3. In a journal bearing, the combination of a box; an axle extending into the same; a member carried by the axle and having an external cylindrical bearing surface; a plurality of rollers each having a central cylindrical bearing surface, and similar end portions smaller in diameter, said central portion alone bearing on the aforesaid cylindrical bearing surface; a sleeve mounted in the box having upon its interior surface radially-disposed bearing faces extending in the same direction, said faces contacting with the adjacent central sections of the rollers and one of the smaller end sections; a collar likewise mounted in the box and provided upon its interior with a similarly disposed radial bearing surface contacting with the other smaller end sections of the rollers; a ring bearing against the outer edge of the collar; and a bonnet secured to the outer open end of the box and serving to hold said ring, and through said ring, the other parts in place.

In testimony whereof I have signed my name to this specification in the presence of two subscribing witnesses.

BENJAMIN S. LAWSON.

Witnesses:
  ROBT. FARRELL,
  JOHN J. SHEEHAN.